(12) United States Patent
Prandi (10) Patent No.: US 6,666,384 B2
(45) Date of Patent: Dec. 23, 2003

(54) APPARATUS AND METHOD FOR APPLYING VARIABLE DOSES OF IRRIGATION AND AGROCHEMICALS

(76) Inventor: Santiago Miguel Prandi, Padre Francisco Palau 275, 5147 Argüello, Provincia de Córdoba (AR)

(*) Notice: Subject to any disclaimer, the term of this patent is extended or adjusted under 35 U.S.C. 154(b) by 55 days.

(21) Appl. No.: 10/005,523

(22) Filed: Dec. 3, 2001

(65) Prior Publication Data

US 2002/0066810 A1 Jun. 6, 2002

(30) Foreign Application Priority Data

Dec. 4, 2000 (AR) ........................................ P000106410

(51) Int. Cl.⁷ .............................. B05B 17/00; B05B 3/00
(52) U.S. Cl. ................................ 239/1; 239/69; 239/97; 239/726; 239/728
(58) Field of Search .............................. 239/63, 67, 69, 239/68, 71, 97, 726, 728, DIG. 15, 1

(56) References Cited

U.S. PATENT DOCUMENTS

| | | | | |
|---|---|---|---|---|
| 5,927,603 A | * | 7/1999 | McNabb ..................... | 239/728 |
| 6,045,066 A | * | 4/2000 | Gerdes et al. ................ | 239/69 |
| 6,095,439 A | * | 8/2000 | Segal et al. .................... | 239/69 |
| 6,138,928 A | * | 10/2000 | LaRue et al. ............... | 239/728 |
| 6,290,151 B1 | * | 9/2001 | Barker et al. ................. | 239/69 |

* cited by examiner

Primary Examiner—Steven J. Ganey
(74) Attorney, Agent, or Firm—Greer, Burns & Crain, Ltd.

(57) ABSTRACT

Apparatus and method for application of treating liquids to a field, the apparatus comprising a plurality of irrigation units including nozzles for applying an adjustable amount of liquid over the field, motor devices for moving the irrigation unit over the ground, a system for delivering the liquid to the nozzles and a control circuit for controlling the operation of the nozzles in order to apply varying doses in several nozzle sections of the irrigation unit, the control circuit comprising a computer unit for receiving inputted data and for operating the control circuit, an independent control module in each irrigation unit, a plurality of sensors for detecting several parameters of the unit and an interface module connecting the independent control modules to each other and to the computer unit.

18 Claims, 5 Drawing Sheets

APPARATUS AND METHOD FOR APPLYING VARIABLE DOSES OF IRRIGATION AND AGROCHEMICALS

BACKGROUND OF THE INVENTION

1. Field of the Invention

The present invention relates to an apparatus and method for the application of adjustable and varying doses or amounts of treating liquids to desired portions of a field, such as portions having plants, crops, particularly in agricultural applications. More preferably, the invention relates to a system for controlling the nozzles, included in or added to, a self-propelled irrigation machine for irrigating water or applying chemicals to the plants or crops. The invention even more particularly, refers to a pulverization apparatus comprising an electronic control system including a central control, such as a computer, and a plurality of independent control modules arranged along the apparatus for controlling selected pulverization sections including nozzles, and an interface module connecting the independent modules to each other and to the computer. The system is capable of being programmed and containing an application map designed according to the needs of the field or specified lot. Basically, the computer unit registers the movements of the apparatus, determines the position of the apparatus at a sequence of time periods and, according to the map, decides the doses to be applied over the field and sends the order signals in packets to the several independent control modules for operating the nozzles.

For the purpose of the present specification the term "treating liquid" must be understood as comprising any fluid, preferably a liquid, for applying to a field, particularly in agricultural applications, and it may be selected from water, chemicals, pesticides, herbicides, nutrients and the like, diluted in water or pure.

2. Description of the Prior Art

It is well known to provide irrigation machines for applying controlled amounts of water for irrigation purposes and even chemicals diluted into the water. There are two main types of irrigation machines including pulverization systems, namely the central pivot machines moving along a circumferential path and the linear machines moving along a straight path, as well as a third type of machine, namely the corner type machine which is adapted to central pivot machines to move over the corner portions of a field. The central pivot machines operates as a radius vector that spins on a central base or tower and comprises a plurality of spans or irrigation units which move independently, following an electromechanically aligned pattern.

The movements of the units are consecutive and coordinated to keep the proper alignment. The sequence of movements is controlled by a control box installed in a last tower and that regulates the speed of the system according to orders programmed on a time basis that determines the on/off percentage. This means that the operator decides on the timing for the rotation of the system by determining the on/off sequence of the last tower. This tower transmits the received information to the remaining towers through an electromechanical system located in the other towers for this purpose. The system is activated when the tower that initiated the movement has already swept a certain angle based on a dead zone, which is suppressed as from the moment the tower has to be moved. The total movement of the pivot system is made through the combination of internal movements of the equipment, which movements must be coordinated to keep the linearity of the system, thus achieving the correct application of the water.

The linear line machines comprises a frontal progression system wherein the spans or irrigation units move along a straight line over the surface of the field under irrigation. As compared to the central pivot system it may be said that the system works as if the fixed point of the pivot tower moved according to a lateral movement pattern. The third type, namely the corner machine, is similar to any span of the pivot type machine but with a different movement control that allows the machine or span to be folded when the boundary of the field or lot under irrigation becomes tangent to the circumferential path followed by the end span of the machine. This span acts like an arm that unfolds itself as the pivot gets away from the field boundary, in order to irrigate the outer surface of the irrigation circumference swept by the pivot machine.

U.S. Pat. No. 3,326,232 discloses an irrigation apparatus for applying agrochemicals with the irrigation water, wherein the water is used for transporting the chemicals in such a manner that the water source is in fluid communication with the chemicals source when the mix is being applied over the ground, thus risking contamination of the water source. In addition, not all the agrochemicals can be used because the same is excessively diluted in the water or the dilution is not enough, without means being provided to keep the proper dilution and concentration. Also, the chemicals can be applied only when the apparatus is operating in the conventional irrigation mode.

U.S. Pat. No. 5,246,164 to McCann, et al., discloses an apparatus and method for dividing a field to be irrigated by an irrigation system into a plurality of zones which can be monitored for irrigation water and chemical requirements and then, delivering by way of the irrigation system, the appropriate amount of irrigation water and/or chemicals to each zone as so defined. The apparatus includes a plurality of sprinklers that are independently controlled by valves responsive to control modules, which are electronically interconnected with a data acquisition and control unit for furnishing signals to the control modules in order to activate the sprinklers or deactivate each sprinkler. Maps from the field are generated by a programmed microprocessor that determines the current position of each independent sprinkler, the microprocessor then sending the registered information to the data acquisition and control system, which in turn sends these signals to the various control modules. While this system seems to provide an acceptable operation, the construction of the same in a particular machine or in a conventional irrigation machine is highly cost effective and cumbersome. The arrangement of the microprocessor, the control modules and the data acquisition and control unit involves an extreme amount of wiring for interconnecting the same. In addition, for purging the apparatus for removing the chemicals from the conduits upon termination of the application, the apparatus must be brought to a part of the field without crops and water must be injected through the conduits to cause the chemicals to be expelled directly from the sprinklers over the field with the dangerous consequences involved in this task against the environment. Also, this system still has the problem of water source contamination, and some chemicals cannot be used because of their inadequate dilution in high water volumes.

U.S. Pat. No. 5,678,771 to Chapman, John A., discloses a chemical distribution system for use with a mobile irrigation system comprising a liquid chemical supply line vertically adjustably supported on the irrigation system and which is in operative communication with a pressurized source of liquid chemical. A liquid chemical distribution line is positioned beneath the chemical supply line between each pair of the drive towers for the irrigation system and which is in fluid communication with a remotely controlled valve which is in fluid communication with a chemical supply line. A plurality of valves and sprinklers associated therewith are provided on each of the distribution lines with the associated valve being operated by a control for activating selective distribution lines whereby liquid chemical may be applied to pre-selected portions of the area over which the irrigation system moves. While the problem associated to the use of water for the application of chemicals have been improved by this system, other drawbacks still remain, such as the need of regulating all the sprinklers, high minimal doses, lacking of a proper cleaning circuit, the doses are fix by lengths, and the need of effecting a manual adjustment when the doses must be modified. Also, this system does not work with corner machines, and the only sprinkler supported is one specially designed for this machine.

As to the known methods employed in the several techniques for irrigation there are two main methods for applying agrochemical products according to varying doses. A first method comprises the use of ground spraying machines, either self-propelled machines or human operated machines. These machines fail in that they need to use a global positioning system (GPS) to move over the ground in order to have a control on the position of the machine in the field. In addition, one or more personnel necessary to operate the machine are exposed to the products which are toxic and harmful for the human beings. These machines not only generate an undesired compaction on the soil and harm the crops, but they also are unable to perform a control over all the stages of the crops because the height of these machines is not enough to move over the highest crops.

The use of irrigation equipment injecting the agrochemicals with the water used for irrigation is also the most inaccurate and harmful method for the environment because the water flow and chemicals are distributed over the soil through the irrigating aspersing nozzles which are generally designed to irrigate and not to disperse or spray chemicals appropriately. When used for fertilizers, this method does not present problems because, even though the distribution of the fertilizer on the surface is not precise, the application may be considered acceptable. However, for using variable doses which require a precise control on all the nozzles in small areas, the method is unacceptable. This implies not only high operation costs but also a very difficult control over the irrigation flow. The method is neither acceptable in the use of other agrochemicals such as herbicides, fungicides, insecticides, etc. In the case of equipment using the water flow for application of chemicals it is necessary to keep a precise control over each spray and the pumping system which must bear the variations in the liquids application flow.

It would be therefore convenient to have a new system for application of variable and adjustable amounts of irrigation water or chemicals, without the drawbacks above mentioned and related to the prior art systems.

SUMMARY OF THE INVENTION

It is therefore one object of the present invention to provide a new apparatus system for overcoming all the above mentioned drawbacks and capable of being mounted in a mobile, self-propelled machine of any type, either a rotating machine, namely a central pivot machine, or a forward moving machine or linear machine, as well as corner machines or rotating machines including irrigation units for irrigating the corners of a field. When used in corner machines, the inventive apparatus is capable of sensing the angle formed by the corner and the circumference swept by the last span of the machine and thus determining the shape of the area covered by the corner machine and controlling the discharge pulses.

It is still another object of the present invention to provide an apparatus and method for application of treating liquids to a field, the apparatus comprising a plurality of irrigation units including nozzles for applying an adjustable amount of liquid over the field, motor devices for moving the irrigation unit over the ground, a system for delivering the liquid to the nozzles and a control circuit for controlling the operation of the nozzles, the control circuit comprising a computer unit for receiving inputted data and for operating the control circuit, an independent control module in each irrigation unit, a plurality of sensors for detecting several parameters of the unit and an interface module connecting the independent control modules to each other and to the computer unit.

It is a further object of the present invention to provide an apparatus for application of treating liquids to a desired portion of a field to be treated with the liquids, the apparatus comprising:
 at least one irrigation unit including a plurality of nozzles arranged into a plurality of nozzle sections, each section applying an adjustable amount of liquid over a section of the field, according to an application map,
 motor means for moving the irrigation unit over the ground,
 liquid delivering means connected to the nozzles,
 a main control panel, and
 control means for controlling the operation of the nozzles in order to prevent the nozzles of a nozzle section from applying liquid over a field section overlapping an immediate field section that received an immediate last application of liquid, the control means comprising:
  i) a computer unit in the main control panel for inputting data and for operating the control means,
  ii) an independent control module in each of the irrigation units, the module being connected to a plurality of sensors for detecting several parameters of the unit, and connected to valves for delivering signal orders for controllably operating the nozzles, and
  iii) an interface module in the main control panel and connected to each of the independent control modules and to the computer unit for providing a communication interface between the independent control module and the computer unit, wherein the independent control module is operable to record information from the several sensors, provide information to the computer unit only upon request from the computer unit, and receive order signals from the computer unit to operate the valves of the nozzle sections.

It is even another object of the present invention to provide a method for applying a treating liquid to a desired portion of a field by means of an apparatus comprising at least one irrigation unit including a plurality of nozzles arranged into a plurality of nozzle sections, motor means for moving the irrigation unit over the ground, liquid delivering means connected to the nozzles, a main control panel, and control means for controlling the operation of the nozzles, the control means including a computer unit in the main control panel, an independent control module in the at least one irrigation unit, connected to a plurality of sensors and to the nozzles, and an interface module in the main control panel and connected to the independent control module and to the computer unit, the method comprising the steps of:

inputting data relating to a desired application map and operating conditions of the apparatus into the computer unit, moving the apparatus and operating the nozzles according to said data, acquiring and storing into the independent control module data relating to position parameters of the apparatus over the ground, requesting said information relating to said position parameters stored in the independent control unit, inputting into the computer unit via the interface module said information relating to said position parameter of the apparatus, calculating a distance parameter by comparing said information with an immediate former information relating to a previous position parameter until reaching a threshold distance parameter, when reaching the threshold distance parameter, sending to the independent control module an order signal for actuating the nozzles.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
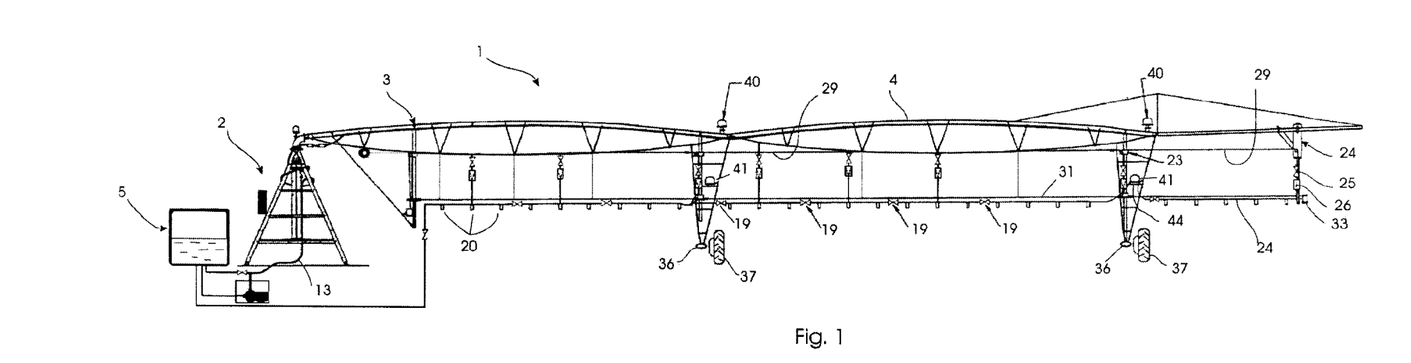
FIG. 1 shows a side elevational view of a self-propelled irrigation apparatus including the teachings of the present invention.
Figure 2:
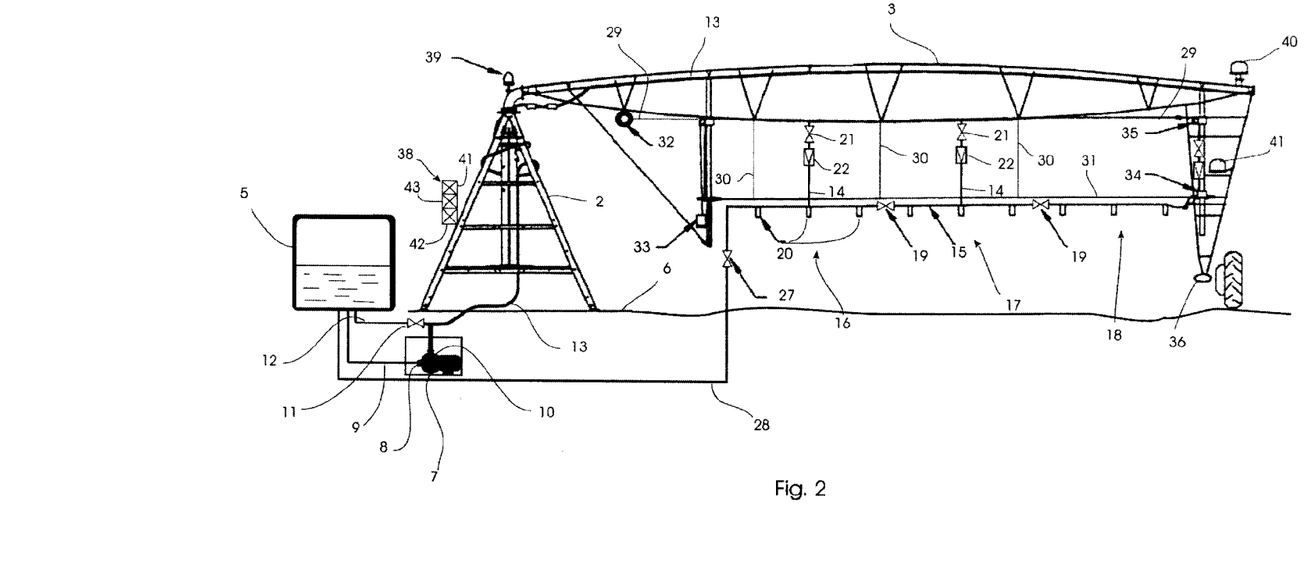
FIG. 2 shows a partial side elevational view of the apparatus of FIG. 1.

Now referring in detail to the drawings it may be seen from FIGS. 1 and 2 a self-propelled irrigation machine 1 of the central pivot type to which the apparatus of the present invention has been added, employing the control means according to the invention. Machine 1 includes a proximal end having a pivot base 2, and a plurality of irrigation units of which only two have illustrated and indicated by references 3, 4. A tank 5 containing a treating liquid to be applied to the field 6 is arranged preferably at the pivot base.

A pumping station is also provided at the pivot base, the station comprising a pump 7 having an inlet port 8 connected to tank 5 via a line 9 and an exit port 10 connected through a 2-way valve 11 to a line 12, which in turn is connected to tank 5, and to a liquid main line 13 for conducting the treating liquid along the machine for pulverization purposes.

Since tank 5 is a stationary tank, it may be that the chemical is deposited in the bottom of the tank by decanting. The purpose of deriving valve 11 is to sequentially open the communication between the exits of the pump in order to direct the liquid into the tank to agitate its content to keep the chemical duly diluted. Tank 5 may contain water, chemicals or combinations thereof.

The liquid is normally conducted from the pump along main line 13 which is fixed to the structure of the machine, at the top thereof. Main line 13 is connected to a plurality of auxiliary lines 14 which in turn are connected to a secondary line 15 running along the entire length of the corresponding span or irrigation unit 3, 4. Secondary line 15 includes a plurality of nozzle sections 16, 17, 18 spaced apart and separated by spherical valves 19, each section 16, 17, 18, including in turn a plurality of nozzles 20. These nozzles may comprise any type of liquid spraying or pulverizing or injecting devices. Valves 19 are normally closed and they open only when are actuated for the cleaning process that will be disclosed below. Each auxiliary line 14 includes an electrically operated valve 21 and a flow sensor 22 for detecting the flow through line 14 in order to determine the occurrence of a failure in the system.

At the end of main line 13 a pressure sensor 23 is connected to the line in order to detect whether the pressure of the liquid in the line is within the acceptable values for pulverization. The end of line 13 is also connected to an end line 24 through a spherical valve 25 and a pressure regulator 26, which line 24 is connected to the end of line 15. For cleaning the lines for removing the chemical therefrom, valves 21 are closed, valves 19 and 25 are opened, a valve 27 connected to a cleaning line 28 is opened and air or cleaning fluid is injected into the system, the air or cleaning fluid being conducted through main line 13, line 24 via valve 25, line 15 through valves 19 and to line 28 through valve 27, for entering back tank 5. The process is carried out until all the chemicals content is removed from the circuit. The chemicals must be removed from the circuit because these products are generally corrosive and the circuits, conduits, valves, etc. are damaged in contact with the product.

Secondary line 15 is pending from a lifting system for adjusting the height of the nozzles relative to ground 6. Lifting system comprises a main cable 29 from which a plurality of auxiliary cables 30 is pending which auxiliary cables support a secondary cable 31 for retaining the secondary lines 15. A motor 32 is connected to main cable 29 to pull from the cable and lift the nozzles or to loose the cable to move the nozzles down. Weights 33 are provided at the end of each irrigation unit and at proximal end of the machine for keeping main cable 29 tight. Secondary cable 31 is kept tight by means of a vertical support 35 and a lifting carriage 34 mounted or tilting on in support 35, with cable 31 connected to carriage 34. Thus, cable 31 is tight but is able to freely move up and down.

The irrigation machine is provided with drive units 36 and wheels 37 for moving on the ground, as well as a main control panel 38 for controlling the operation of the machine and providing the necessary power for the several components and electronics. A collector ring 39 and span control boxes 40 are also provided interconnecting the components of the machine. The control electronics or control means for controlling the operation of the nozzles comprises an independent control module 41 (FIGS. 3 and 4) in the main panel 38 and in each span or irrigation unit 3, 4, with modules 41 being connected to a plurality of sensors for detecting several parameters of the associated unit, and connected to the valves for delivering signal orders for controllably operating the nozzles. Independent control module 41 will be better disclosed below in connection to FIG. 3. According to the invention, the provision of a control module 41 in each span requires the use of only two conductors for connecting all the modules to each other through collector ring 39. The two conductor wires carry the data from the several sensors via the independent control modules to the computer via the interface module, and the order signals from the computer unit via the interface module to the valves via the independent control units. The control module used in the conventional machines requires the use of several conductors to connect the modules with the main control or computer.

Figure 4:
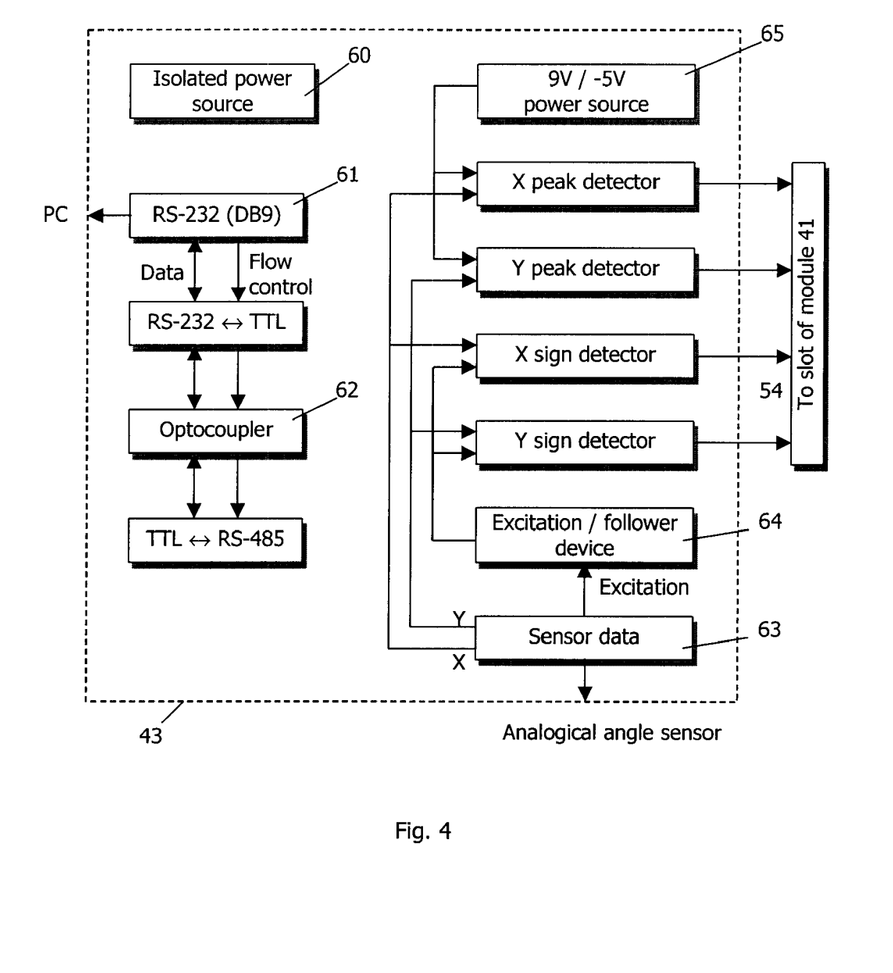
FIG. 4 shows a schematic diagram of the interface unit according to the invention.

Main panel 38 also includes a computer unit 42 for inputting data and for operating the control means, and an interface module 43, better illustrated in FIG. 4, connected to independent control modules 41 and to computer unit 42 for providing an interface communication between the independent control modules and the computer unit, wherein the independent control module is operable to record information from the several sensors, provide information to the computer unit only upon request from the computer unit, and receive order signals from the computer unit to operate the nozzle sections.

Interface module 43 is also able to read the angle detected by a conventional analogical angle sensor, either already existent in the irrigation equipment or installed with the pulverization system, for detecting the current position of the machine over the field.

Independent module 41 is connected, through a proper conductor, to valve 11 for bypassing the flow from pump 7 into tank 5 in order to agitate its contents. The independent control modules 41 in all the irrigation units are connected to all the electrically operated valves 21 for controlling the liquid flow in each nozzle section 16, 17, 18. Spherical valves 19, 25 and 27 may be optionally replaced by electrically operated valves and may be connected to the closest independent module 41 in order to automize the cleaning system.

If a corner machine or span is installed on the pivot machine, the independent control module 41 mounted in the end span of the machine, adjacent to the corner span, will be in charge of reading the angle sensor detecting the angular position of the corner machine. In order to increase the precision of the system, a DGPS module 44 may be connected to module 41 of the end span of the machine.

Figure 6:
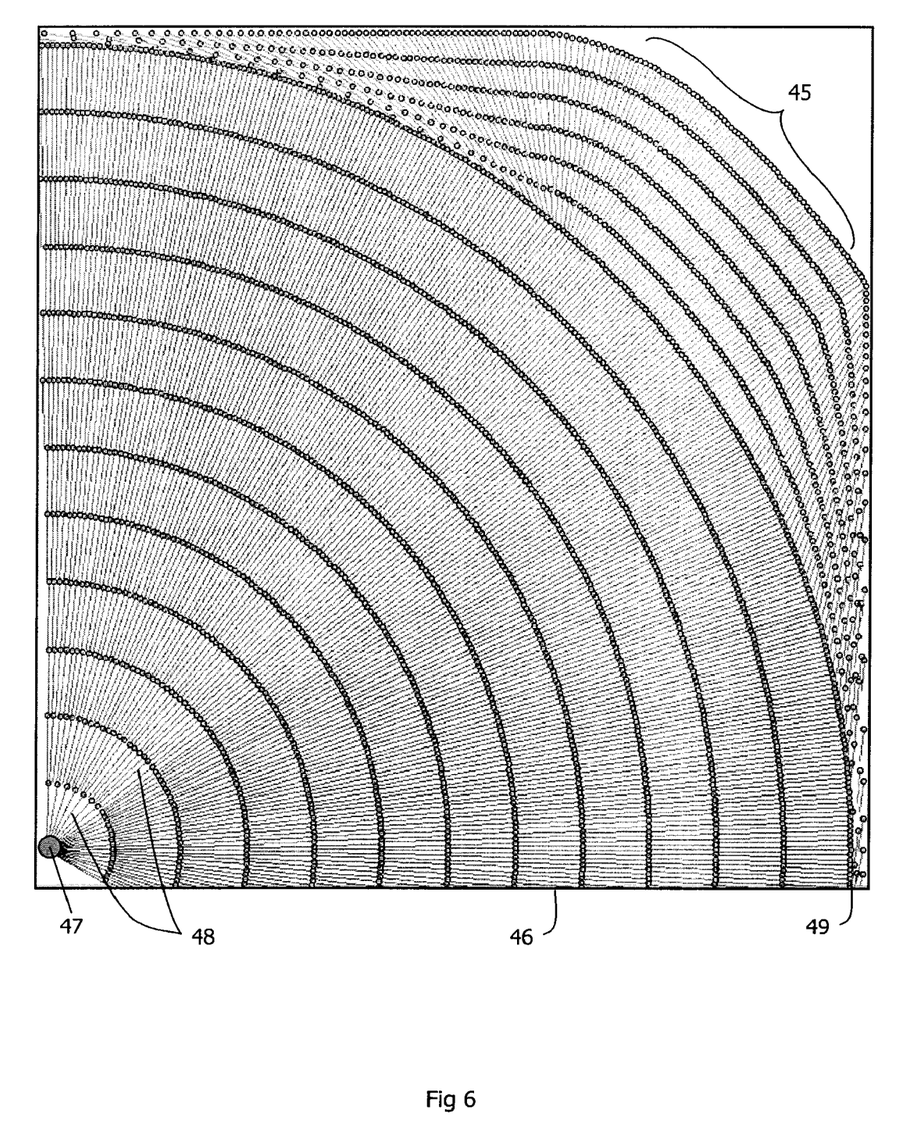
FIG. 6 shows a simulation of an application process, showing the segments corresponding to simulated applications of each nozzle section.

FIG. 6 shows a graph corresponding to a simulation of the application of liquid over a corner portion 45 of a lot or field 46 corresponding to a quarter of an entire circumferential path of a central pivot machine operating with the pivot base located at point 47. Each segment 48 corresponds to a line of application of liquid by a nozzle section. Corner portion 45 is defined between the upper and right-hand straight boundaries and the outermost circumferential path corresponding to the outermost drive unit of the outermost span. According to the invention, the nozzles of a nozzle section are prevented from applying liquid over a field section overlapping an immediate field section that received an immediate last application of liquid. As it can clearly be seen in FIG. 6, the application of liquid is uniform in all the different positions of the corner machine, even when the corner arm is completely folded in portion 49 on the field, which does not occur in conventional machines using corners. This is achieved by the method and apparatus of the present invention by providing the above described control means that are programmed so that the valves are actuated once a nozzle section has moved along an accumulated length according to the formula:

$$P = (P2 - P1) \cdot \cos(a),$$

wherein:
P1 is the position of a central point of the nozzle section at a predetermined time,
P2 is the position of the central point of the nozzle section at a time immediately subsequent to said predetermined time, and
a is the angle defined between the vector P2–P1 and a line perpendicular to a line defined by the nozzles of the nozzle section.

The several sensors mounted all along the machine are connected to the control means and this means are connected to the several valves to operate the nozzles. In order to remarkably reduce the amount of cabling along the machine, only one independent control module 41 is located in each irrigation unit, with all the information picked up by the sensors of such unit being communicated to the corresponding module 41. Thus, the computer can request information of any sensor in the machine by requesting this information to only such module 41 associated to the corresponding sensor. In like manner, if a signal order must be sent to any valve, this signal is sent to the corresponding module 41.

Figure 3:
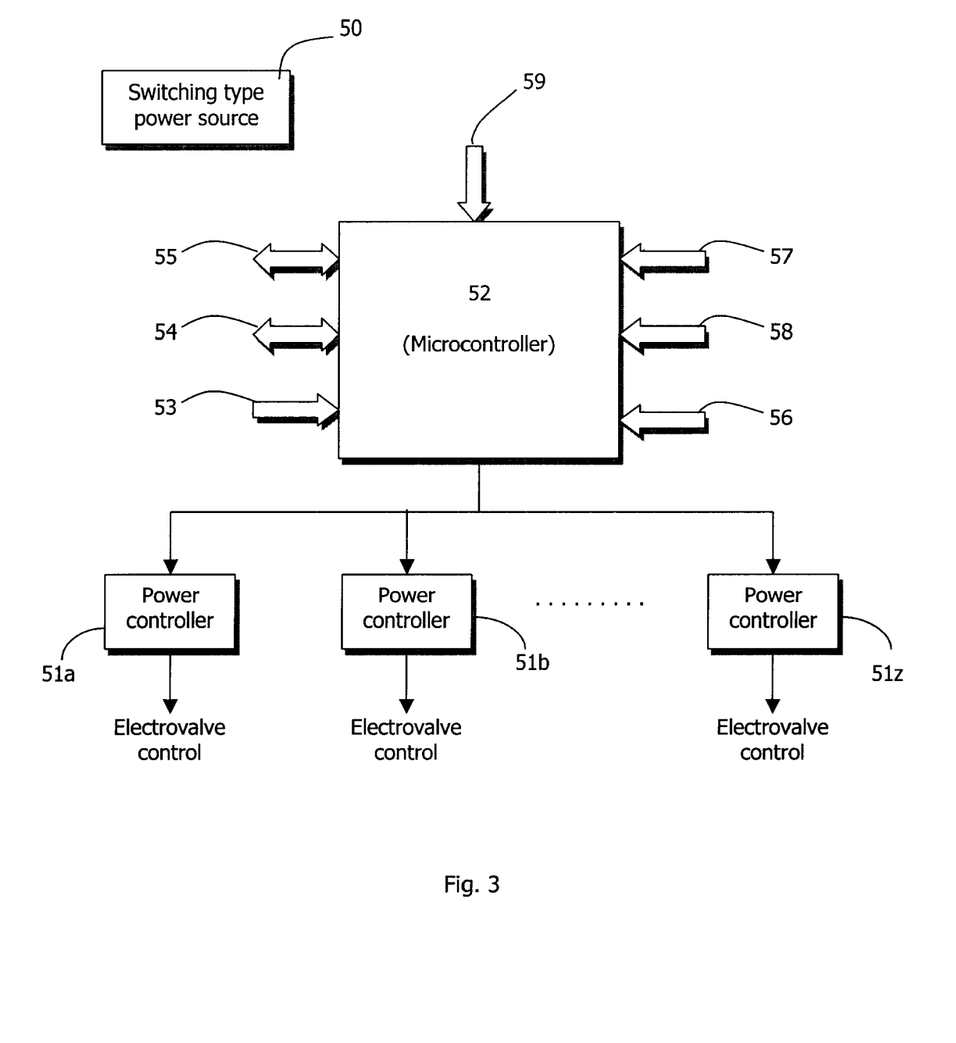
FIG. 3 shows a schematic diagram of the independent control unit according to the invention.

As it is shown in FIG. 3, module 41 comprises a switching type power source 50, capable of reducing the tension from 36 vac to 5 vdc without overheating. The valves and contactors in the machine are operated by power triacs (not shown) forming part of respective power controllers 51a, 51b, 51z. While relays could be also used, the same would have a much shorter life span. The basic module is operated by a microcontroller 52, which coordinates the information coming from a plurality of sensors connected to the board, and also operates the triacs for turning the valves on and off. Digital tension sensor 53 (AC/DC) permits the module to detect the tension reaching to motor of the drive unit 36, thus knowing whether the same is on or off. For security purposes of the circuit, the information input of the sensor is optoisolated. This basic module also includes several input and output ports for connecting the binary sensors located in the machine, as well as includes auxiliary analogical inputs for connecting analogical sensors. Inputs 57 and 58 are provided for pressure and flow sensors, respectively. An expansion slot 54 is also provided for connecting auxiliary boards, such as interface module 43, for example. The module is communicated with the entire system through a bi-directional communication module RS485, indicated by 55. A 5-line direction selector provides the module with identification in the system, thus permitting the use of 32 devices. An input 59 for ten lines is provided for reading a digital angle sensor, which may be provided in some conventional machines instead of the analogical angle sensor above mentioned.

Micro-controller 52 is also operable to provide the interface between the sensors and the RS485 inter-module communication net, thus operating the entire communication protocol by means of which it is possible to provide the orders to the board or request the information from the corresponding sensors.

Module 41 is located in the base of the equipment, namely module 41 installed in panel 38 is connected, at slot 54, to interface module 43, better illustrated in FIG. 4, which provides the interface communication between the several modules 41 and computer 42 in order to carry out the control of the system. This board also includes special inputs for connecting an analogical angle sensor, which is already installed in some central pivot machines or is provided with the inventive apparatus. The interface used in the connection to the computer 61 is compatible with a standard serial port (RS-232), and the circuit carries out the conversion to RS-485 through TTL compatible signals. An isolated 9-volt standard power source 60 is necessary for the RS-232 port. Both parts are isolated by an optocoupler 62 and the communication is bi-directional but half-duplex and the control over the flow direction is carried out by the computer.

The remaining part of the diagram conforms an interface circuit for an analogical angle sensor, connected through port 63, which operates under sinusoidal excitation signals generated in an included excitation device 64. This excitation device can be used as a follower in the event the sinusoidal signal is already present and generated by the control panel of the irrigation equipment. A small +9 v/−5 v increasing/inverting power source 65 is also present for providing the peak detectors with a good resolution. The information furnished to the independent control module consists of the amplitudes measured in X and Y axes of the sensor, the ratio of which allows determining the angle in a quadrant, and the signs of both axes, for determining the correct quadrant.

During the operation of the machine, any failure must be detected in the main line, pumping station, and any of the secondary lines and nozzle sections. The main pressure sensor 23 is used to detect a flow drop in the main line. An additional pressure sensor may be provided at the beginning of the main line for comparing the measures of the main sensor 23 and this additional one. If the measure is low in both sensors, it may be said that there is an important leak in the lines or a failure in the pumping station. If the main sensor indicates a low value and the additional sensor indicates a normal value, it is quite probable that the tank must be replenished. When none of the nozzle sections is shooting both sensors must read the same value, but if under such condition the main one is reading a lower value there may be a small leakage in the main line.

The problems in the secondary lines are detected by flow sensors 22 capable of detecting the amount of liquid that is flowing inside the line. The presence of flow in a not proper situation or the lack of flow during the activation of the nozzles will indicate a failure in the valve controlling the associated section. If the flow is low and the main pressure sensor 23 indicates a low pressure, it is possible that the auxiliary line corresponding to the associated section is disconnected from the main line.

During a normal operation of a nozzle section, the nozzles themselves define a flow limit; therefore, when an overflow is detected during a nozzle shot, damage may be determined in the secondary line of that section. Immediately the independent module 41 in that section will stop the operation and inform about the situation to a central control module conformed in a program in the computer. Since the flow of liquid is present only during the opening or shot of the nozzles, the presence of flow after the nozzle shot indicates that some nozzles are broken and leaking. This differs from a failure in the electro-valve, in which event if the valve remains open the flow will be constant for all the time the valve should be closed.

If a nozzle is blocked or clogged, a precise flow sensor would indicate a lower flow during a shot. However, since it is advisable to control the conditions of the nozzles periodically, there should be no need of checking this during the operation of the equipment.

The microcontroller 52 includes a program offering basic preemptive multitasking services; therefore it distributes the use of the microprocessor in an efficient manner according to the needs imposed by the external events. The processes are executed in parallel and comprise:

A main cycle for reading the received information, validating the communication packets and interpreting and executing the received orders;

An on/off valves cycle for controlling the application of the liquid;

A cycle for measuring and storing information about the tower movement;

A cycle keeping time-references updated, which may be affected only by the variations in the frequency of the clock signal feeding the microcontroller;

Detection of flow and pressure failures and a quick actuation control independently of the orders from the computer, which would be slower because of communication just when urgent decisions must be taken;

Detection of failures from communication delays, the actuation of the module being interrupted in case of a long delay until the communication is reinstated;

A communication cycle independently operating the receiving and sending of data packets.

The communication is carried out by employing a protocol using information packets having a variable size, with a system for error checking based in the calculation of an 8-bit CRC as a way for validation. The heading of the packet includes the address or ID of a module 41, which ID is unique for each module 41 only the computer can initiate communication, with modules 41 being forced to send a reply identified by their own ID or address. The collision of packets in the communication line is avoided by preventing the modules 41 from initiating a communication; they only can reply upon request from the computer. The communication is fluid and the computer request information from modules 41 several times a second to quickly have a report on any failure. The operation of the system is interrupted if any module 41 does not reply to the computer. In addition, all the modules include a system for interrupting the operation of the valves if there is no communication for a period of time, which would imply a problem in the computer or in the communication lines.

The computer includes a central control module (CCM) implemented in software, with an algorithm capable of operating in any PC or laptop running a multitasking operative system compatible with the POSIX specifications. It has been implemented under Microsoft Windows™, Linux™, BeOS and QNX. A special multithreaded implementation is supported under DOS. The use of computer software offers a great versatility and many facilities for performing adaptations to particular situations, as well as permits the use of a complete and friendly interface for configuring and monitoring the system by the operator.

The computer unit, and more particularly the CCM, includes a simulator for predicting movements, preferably the advancing of the apparatus, for a time period ahead of the real movements, the simulator receiving present information of the real conditions in order to adjust the operation of the nozzle sections with time enough to accomplish with any new requirement.

Figure 5:
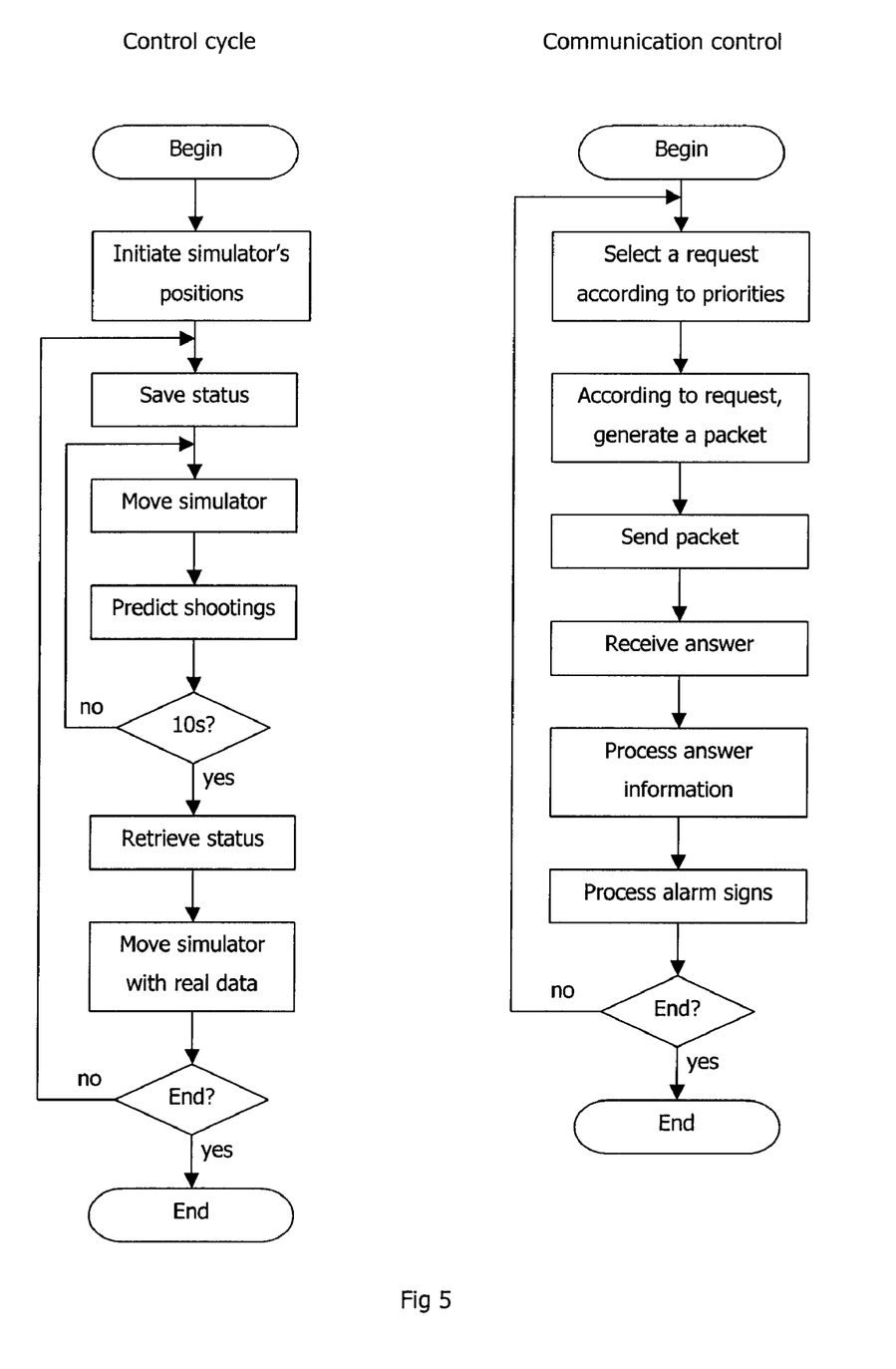
FIG. 5 shows a flow chart illustrating the control steps carrying out by the method according to the invention.

The CCM comprises two main execution threads, one for taking decisions and the other for performing the communication. These threads are illustrated in FIG. 5. According to the control cycle, the simulator is advanced a base time unit, preferably 0.1 seconds, the angle and speed parameters are adjusted on the basis of the information received from the modules, and the start and duration of the nozzle shots are predicted for the following 10 seconds. Then, the control cycle returns to the last validated position and the new advancement is carried out according to the last received information. It is advanced until a point where there is no information about the movement of any one or more of the spans or irrigation units. Herein, the status is stored as a new validated position, and the cycle is repeated thus simulating again the 10 seconds ahead.

The communication cycle selects the request, from a bag-like data structure storing communications requests, according to the priority of each request. The priorities are dynamic, and they vary according to the urgency of the needs for communicating some particular data, and according to the last time a request has been attended. Once a request is selected, the necessary data for preparing the communication packet is calculated which packet is sent to the corresponding module. From the received reply, the information sent by the module is processed, including the movement of the equipment and the activation of possible alarms. This request-based communication system permits to prepare data packets with the most updated information generated by the control cycle at the moment of sending the communication packet. If, instead of requests, pre-prepared data packets are to be employed, it could occur that the information generated by the cycle has became obsolete at the moment the packet is sent. The internal variables of the algorithm shared by both processes permit to know the present, and immediate recent, status of the system and also to store a prediction of the operation for the immediate future. The operation depends of an application map including the needs of doses that are appropriated for each portion of the field or lot. The application map may be generated from a yield map, irrigation map, ground analysis, or designed by the operator.

The invariant of the control cycle involves all the parameters that must be accomplished each time the cycle is entered. In order to perform a correct control, the estimation of the position of the irrigation units or spans must be valid and the doses applied to the field already swept by the system must be correct. Since the invariant must be accomplished when entering the cycle, the data must be initialized. With the information from the angle sensor the initial angles are estimated between the spans and the position of each tower or span is calculated with a certain error range, which error will be corrected during the operation of the system. The machine is started without applying the treating liquid over the field, collecting information about the machine status for correcting the estimations initially made and for carrying out a general control of the equipment. This step may be avoided if approximate calibration information is available.

The machine is then placed in the application start point. Since the distance traveled by the machine at this moment is zero, the invariant is trivially accomplished. Under these conditions it is possible to enter the cycle body. There are several termination conditions. Any error must lead to the immediate stop of the system. If there are no errors the cycle finalizes the execution when the swept area is completed. If the invariant has been complied with and if the swept area has been completed, it can be concluded that the application of doses has correctly concluded. The software does not carry out the advance towards the termination of the cycle but it follows the machine movements. Therefore, for guarantee the compliment with the invariant, it is necessary to indicate to the each module, in every cycle, the proper doses to be applied by each of the nozzle sections. Therefore, the cycle must read the information from the modules and must use that information for updating the relative angles between the irrigation units. With the reading from the angle sensor in the base of the equipment, the absolute positions of each unit or span are obtained and the doses corresponding to each section are thus determined. The doses values are communicated to the independent modules by means of start-time and duration orders in pairs. These values must be calculated for obtaining a good distribution of the product over the field, trying to avoid, as much as possible, simultaneous shootings in different sections for preventing subsequent problems related to pressure drops in the liquid lines. In the event of too many simultaneous shots, the advancing or movement of the machine may be interrupted in order to execute those shots sequentially. Since the shot information given by the CCM is time based, it must also transmit a clock-synchronizing signal. Therefore, it may completely control the remaining parts of the system. Additional information provided into the net of control modules 41 may be the pressure status in the main line taken by the pressure sensor 23, as well as any correction factor or change in the status of the remaining parts of the machine, related to the modules.

The control of errors, that is necessary for guaranteeing the accomplishment of the invariant in the cycle is very strict. Upon occurring an error, the system immediately interrupts the operation. This is done in this way in order to prevent a damage from occurring in the field or ground due to a machine failure, particularly a damage excessively extended over the field. The movement of the equipment will be permitted while the operation is going on according to what is established in the CCM, therefore, the accomplishment of the invariant are assured in each execution cycle.

The decision about the moment the nozzle is to be shot depends on the type of nozzles employed in the system. If the nozzle is the loading/shooting type the amount of liquid collected and discharged by the nozzle is fixed, therefore, the control over the nozzle's shots is carried out by varying the distance between consecutive shots, therefore, for less doses, the shootings will be more spaced and vice versa. If the nozzle applies liquid while the valve is open, the shot is performed at regular distance intervals depending on the radius covered by the nozzle and the doses are adjusted by varying the time during which the valve is open. The optimal distance between shootings will be calculated on the basis of the nozzle parameters also depending of the type of application to be carried out over the field.

In order to obtain an uniform application of the product over the field it is considered that a nozzle section has traveled the distance necessary for a new shot when said value is reached by accumulating the values of the several distances traveled by the center of the section, taking into consideration, in the calculus, only the projection of the distance vector in a direction perpendicular to the vector corresponding to the nozzle section. Mathematically, if t is the line defined by the nozzles of the nozzle section, p1 and p2 are successive positions of the center of the section, and a is the angle formed between the vector difference (p2−p1) and a line perpendicular to t, the accumulated distance is:

$$(p2-p1) \cdot \cos(a).$$

This calculus provides a uniform application for all the nozzle sections of all the spans and, independently of the movement or travel thereof, whether this movement is lineal or pivotal or it corresponds to a corner travel. As it was already explained, FIG. 6 shows a simulation of the operation of this algorithm in a central pivot machine having a corner irrigation unit only the starting points of the shots are illustrated but not the duration of these shots. The applied dose is defined by its duration. It is clear from this figure the high level of uniformity of the application even when the corner unit is practically entirely folded and parallel to the boundary of the lot.

The simulator provides a prediction of the machine operation for a small period of time in order to estimate the control orders. Advantageously, this system allows sending the order signals with enough time for preventing any communication problem that, otherwise, would provoke delays in the reply of the modules or any other erroneous operation. In addition, this prediction permits to prevent the excessive simultaneous shots. Having the information about several simultaneous shots, it is possible to re-arrange the same in order to prevent an overcharging of the pump that could exceed the pump capacity. In the event that no appropriate rearrangement is found, evidencing pressure problems, the movement of the equipment is momentarily interrupted and the corresponding nozzle sections are shot in sequence. In that way, it is not necessary to count on an oversized pump, which, otherwise, should be able to support the worst situation wherein all the sections are shooting their nozzles at the same time.

The employed simulator is based on a simplified vectorial model of the irrigation equipment, wherein the separated movements of each unit are registered and a vector representing each unit is determined. The real physical forces actuating on the equipment are not taking into account because any error is compensated by means of the adjustment of the length of each span or unit when each traveling cycle is completed. The simulator calculation is adjusted on the basis of the real information taken from the independent control modules. The information acquired by the sensors basically consists of the activation times of the motors for advancing the towers or irrigation units. By knowing the tension reaching the motor and the diameter of the wheels of the units, the traveling velocity of each unit is calculated. There is a direct and linear relationship between the times of motor activation and the distance along which the units are traveled and therefore, the position of each unit or tower in the field is precisely determined. A GPS module could be used in each of the irrigation units for this purpose, but that would be much more expensive.

According to all the above information, the method of the invention may be defined as comprising the steps of:

inputting data relating to a desired application map, such as an yield map, and operating conditions of the apparatus into computer unit 42, moving the apparatus and operating valves 21 according to said data, acquiring and storing into independent control module 41 data relating to position parameters of the apparatus over the ground, requesting said information relating to said position parameters stored in the independent control unit, inputting into the computer unit via interface module 43 said information relating to said position parameter of the apparatus, calculating a distance parameter by comparing said information with an immediate former information relating to a previous position parameter until reaching a threshold distance parameter, when reaching the threshold distance parameter, sending to the independent control module an order signal for actuating the nozzles. Preferably, the position parameter is selected from the group consisting of the movement of the nozzle sections over the ground and the global position of the nozzle sections.

The information relating to the movement of the nozzles over the ground, are acquired through sensors located in the irrigation unit and connected to the independent control module. The information relating to the position parameter of the apparatus is requested by and inputted into computer unit 42 for carrying out said calculating step, this information being provided to the computer unit by the independent control unit only upon request from the computer unit, the independent control unit receiving order signals from the computer unit to operate the nozzles. The order signal is sent by the computer unit to actuate the nozzles of each nozzle sections once the corresponding nozzle section has moved an accumulated length according to the formula $P=(P2-P1)\cdot\cos(a)$, as explained above.

In order to prevent the above-mentioned failures, the flow of the liquid in the auxiliary line is sensed for detecting any failure in the lines. The method further comprises the step of taking liquid from tank 5 and feeds the liquid back to the tank for agitating the liquid contained in the tank, the liquid being elected from the group consisting of water, chemical and combinations thereof.

As it was above indicated, the present system prevents several failures from occurring in the equipment. In addition to the complete information about the positioning of each unit over the field, necessary to know the doses to be applied, it is also possible to take a measure or detection of incorrect alignment of the irrigation machine. It is very common that the several irrigation units are out of alignment and, therefore, a correction is necessary. Since the angles between the several spans or irrigation units are known during the operation of the machine, the control system provides the operator with an estimation of the necessary adjustment that should be carried out in the system for correcting the alignment. In this manner, the data that necessarily must be obtained for controlling variable doses are also used for alignment purposes. This same data are used for presenting the operator with a scheme about the machine and the irrigation units in the display of a computer, which is very useful for monitoring the system.

If there is any discrepancy between the predicted movements and the movements reported by the sensors, it may not be possible to report about the failures in the calibration of the dead zones in the movements of the units and about information necessary for the corresponding correction. In any event, this only affects to this additional information but not to the application of chemicals because the position of the simulator is permanently adjusted on the basis of the information taken by the sensors.

Any probable failure is also detected in the modules. A fluid communication with the modules assures the detection of any failures in any of them in less than a second. If the module detects a failure this information will be reported to the CCM as soon as the module is requested of information. If the failure is not reported, the request to the unit in charge of the section where the failure has occurred will never be completed and, therefore, the CCM will interrupt the operation of the equipment. If any of the parts fails to participate in the information interchanging protocol, the communication is interrupted and each module enters into a stop status waiting for a reactivation order. In this manner, it is assured that all modules will be applying the correct doses; otherwise, the process is interrupted.

Other failures that can be prevented in the system are those that may occur in the fluid lines. If the pressure sensing indicates a low value, the CCM will be immediately informed and it will rapidly interrupt all the system. In this way the damages from any excessive liquid leakage over the field is restricted practically only to the point where the failure has occurred, without having the leaking being extended ahead. In the case the failure of the leakage occurs in a nozzle section, which failure would not be detected if only one pressure sensor would be used, the flow sensor will detect that failure. In this way, almost the entire failures or leakages of any hydraulic circuit component are detected. In addition, any valve failure such as when a valve remains constantly open or closed is also detected.

Any error in sensing the angle of the irrigation machine would not be noticeable in the irrigation units near the base, but can be very big in the last spans, especially in large machines. A single DGPS module 44 located in the drive tower of the last span can be provided in order to correct the error in this last span, correction that can be propagated to the other irrigation units backwards to the base of the equipment.

Another failure that produces cumulative errors in the operation of the machine is due to excessive noise in the machine, which causes the modules to reset because of lack of stability in the power feeding, thus loosing the information about the movement of the machine stored since the last communication with the CCM. This is not a big problem provided that it does not appear frequently and that communications are being fluidly carried out. However, in an environment having high probabilities of noise, it may occur that the information packets are lost, thus increasing the communication times; therefore, the cumulated errors can produce a difference between the position calculated by the machine and the real position of the machine. In order to cope with this problem, the CCM stores the history of the tower or unit's movements. When a module is reset, it progresses with the normal operation but it informs the CCM that a failure has occurred. With the history of the components and failures duly stored, a compensation of the error can be carried out. The system will be interrupted only in the event of many successive failures in the same span or irrigation unit, particularly when the compensation runs the risk of being non adequate. The interruption of the system lasts until the operator confirms to the CCM the real position of each unit for continuing with the operation without errors. It can be seen that the CCM, hosted in the program of the computer, plays the function of director and coordinator of all the system and is in charge of controlling the integrity and appropriate operation of the equipment.

The configuration of system comprises two steps. The first step comprises the inputting of parameters defining the operation environment and it is carried out and tested during the steps of installation of the equipment, including the physical placing of the apparatus, types of nozzles, etc. The second step is under the responsibility of the operator and it consists of indicating how the application of some liquid should be carried out. The operator must define the application map, also indicating the desired doses in each level of application. All the configuration parameters are inputted directly into the CCM and this module presents all the monitoring information to the operator during the time the pulverization system is operating.

The apparatus of the invention may be remotely controlled by providing computer 42 with an access to Internet. When the machine is comprised of many spans or irrigation units, making the machine very long, the liquid may be re-pumped in order to keep the necessary pressure level along the entire length of the machine. In this event, an additional pressure sensor may be required immediately upstream the re-pumping system.

While preferred embodiments of the present invention have been illustrated and described, it will be obvious to those skilled in the art that various changes and modifications may be made therein without departing from the scope of the invention as defined in the appended claims.

I claim:

1. An apparatus for application of treating liquids to a desired portion of a field to be treated with the liquids, the apparatus comprising:

a plurality of irrigation units including a plurality of nozzles arranged into a plurality of nozzle sections, each section independently applying an adjustable amount of liquid over a section of the field, according to an application map;

motor means for moving the irrigation units over the ground, liquid delivering means connected to the nozzles, a main control panel, and control means for controlling the operation of the nozzles in order to prevent the nozzles of a nozzle section from applying liquid over a field section overlapping an immediate field section that received an immediate last application of liquid, the control means comprising:

i) a computer unit in the main control panel for inputting data and for operating the control means, ii) an independent control module in each of the irrigation units, the module being connected to a plurality of sensors for detecting several parameters of the unit, and connected to valves for delivering signal orders for controllably operating the nozzles, and iii) an interface module in the main control panel and connected to each of the independent control modules and to the computer unit for providing an interface communication between the independent control modules and the computer unit, wherein the independent control modules are operable to record information from the several sensors, provide information to the computer unit only upon request from the computer unit, and receive order signals from the computer unit to operate the nozzles, the independent control modules of the units being connected to each other by two conductors, the two conductors connecting all the independent control modules are also connected to the interface module, the two conductors carrying the data from the several sensors via the independent control modules to the computer via the interface module, and the order signals from the computer unit via the interface module to the nozzles via the independent control modules.

2. The apparatus of claim 1, wherein the plurality of irrigation units comprises a central irrigation unit connected at one end thereof to a central pivoting base and connected, at an opposite end thereof, to at least one irrigation unit, wherein the main control panel with the computer unit and the interface module are placed in the central pivoting base.

3. The apparatus of claim 1, wherein the irrigation unit includes a main liquid line delivering the liquid to a secondary liquid line via an auxiliary liquid line including a flow sensor for detecting any failure in the lines, the nozzles being arranged in the secondary liquid line.

4. The apparatus of claim 3, wherein the liquid delivering means comprises a tank containing the liquid and a pump connected to the tank and to the main liquid line for taking the liquid from the tank and delivering the liquid to the main line, the pump being also connected to the tank via a by-pass connection to take liquid from the tank and feeding the liquid back to the tank for agitating the liquid contained in the tank.

5. The apparatus of claim 3, wherein the secondary liquid line is connected to motor means for adjusting the height of the secondary line from the ground.

6. The apparatus of claim 3, wherein the liquid delivering means comprises a tank containing the liquid and a pump connected to the tank and to the main liquid line for taking the liquid from the tank and delivering the liquid to the main line, the apparatus further comprising a cleaning line connected to the tank and to the secondary liquid line including the nozzles, whereby a cleaning fluid or air is provided by the pump or an air-compressor through the main line and the secondary line to purge all the liquid from these lines back to the tank via the cleaning line.

7. The apparatus of claim 3, wherein the nozzles are actuated once the nozzle section has moved along a length accumulated according to the formula $P=(P2-P1) \cdot \cos(a)$, wherein:
P1 is the position of a central point of the nozzle section at a predetermined time,
P2 is the position of the central point of the same nozzle section at a time immediately subsequent to said predetermined time, and
a is the angle defined between the vector P2–P1 and a line perpendicular to a line defined by the nozzles of the nozzle section.

8. The apparatus of claim 1, wherein the liquid is elected from the group consisting of water, chemicals and combinations thereof.

9. The apparatus of claim 1, wherein the independent control module comprises a microcontroller including respective input ports connected to said sensors, the sensors comprising pressure sensors, flow sensors, tension sensors, the microcontroller also including an input port connected to 10-line digital encoder support, an expanding connection slot, a RS485 communication port, and an exit port connected to controllers for operating the nozzles.

10. The apparatus of claim 1, wherein the computer unit includes a simulator for predicting movements for a time period ahead of the real movements, the simulator receiving present information of the real conditions in order to adjust the operation of the nozzle with time enough to accomplish with any new requirement.

11. The apparatus of claim 1, wherein the two conductors are conductor wires.

12. A method for applying a treating liquid to a desired portion of a field by means of a pulverization apparatus comprising at least one irrigation unit including a plurality of nozzles arranged into a plurality of nozzle sections, motor means for moving the irrigation unit over the ground, liquid delivering means connected to the nozzles, a main control panel, and control means for controlling the operation of the nozzles, the control means including a computer unit in the main control panel, an independent control module in the at least one irrigation unit, connected to a plurality of sensors and to the nozzles, and an interface module in the main control panel and connected to the independent control module and to the computer unit, the method comprising the steps of:
inputting data relating to a desired application map and operating conditions of the apparatus into the computer unit,
moving the apparatus and operating the nozzles according to said data,
acquiring and storing into the independent control module data relating to position parameters of the apparatus over the field,
requesting said information relating to said position parameters stored in the independent control unit,
inputting into the computer unit via the interface module said information relating to said position parameter of the apparatus,
calculating a distance parameter by comparing said information with an immediate former information relating to a previous position parameter until reaching a threshold distance parameter,
when reaching the threshold distance parameter, sending to the independent control module an order signal for actuating the nozzles,
wherein the position parameter is selected from the group consisting of the movement of the nozzle sections over the field and the global position of the nozzle sections, and
wherein the order signal is sent by the computer unit to actuate the nozzles of each nozzle section once the corresponding nozzle section has moved along a length accumulated according to the formula $P=(P2-P1) \cdot \cos(a)$.
wherein:
P1 is the position of a central point of the nozzle section at a predetermined time,
P2 is the position of the central point of the nozzle section at a time immediately subsequent to said predetermined time, and
a is the angle defined between the vector defined by the positions P2 and P1 and a line perpendicular to a line defined by the nozzles of the nozzle section, whereby the nozzles of the nozzle sections are prevented from applying liquid over a field section overlapping an immediate field section that received an immediate previous application of liquid.

13. The method of claim 12, wherein the step of acquiring and storing comprises acquiring and storing information relating to the movement of the nozzles over the field, the information being acquired through sensors located in the irrigation unit and connected to the independent pulverization module.

14. The method of claim 12, wherein the information relating to the position parameter of the apparatus is requested by and inputted into the computer unit for carrying out said calculating step, this information being provided to the computer unit by the independent control unit only upon request from the computer unit, the independent control unit receiving order signals from the computer unit to operate the nozzles.

15. The method of claim 12, wherein the irrigation unit includes a main liquid line delivering the liquid to a secondary liquid line via an auxiliary liquid line, the method further comprising sensing the flow of the liquid in the auxiliary line for detecting any failure in the lines.

16. The method of claim 15, wherein the liquid delivering means comprises a tank containing the liquid and a pump connected to the tank and to the main liquid line for taking the liquid from the tank and delivering the liquid to the main line, the pump being also connected to the tank via a by-pass connection, the method further comprising the step of taking liquid from the tank and feeding the liquid back to the tank for agitating the liquid contained in the tank.

17. The method of claim 15, further comprising the step of operating motor means for adjusting the height of the secondary line from the ground.

18. The method of claim 12, wherein the liquid is elected from the group consisting of water, chemicals and combinations thereof.

* * * * *